UNITED STATES PATENT OFFICE.

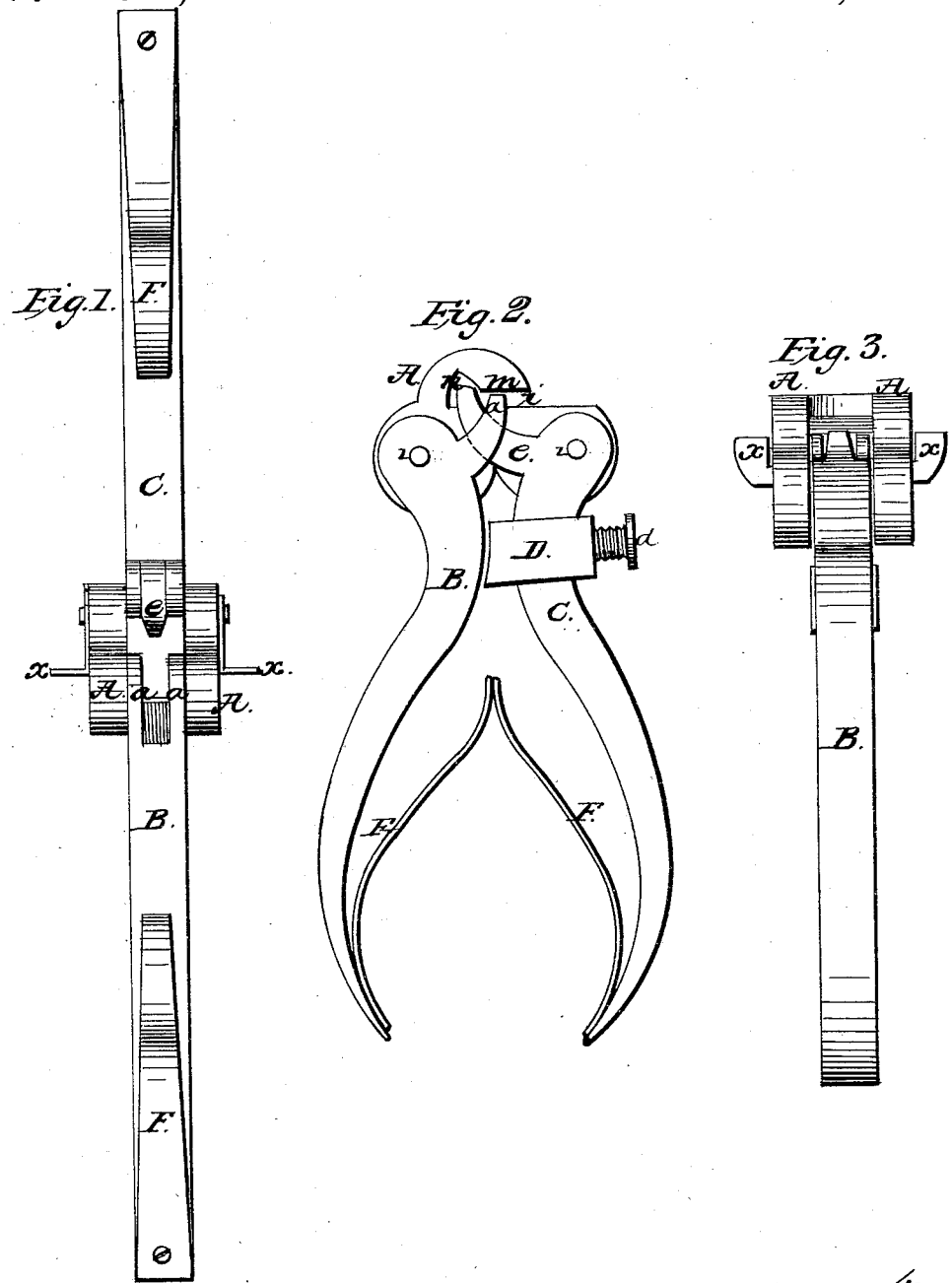

EDWARD MARSHALL, OF NEW YORK, N. Y.

SAW-SET.

Specification of Letters Patent No. 22,256, dated December 7, 1858.

*To all whom it may concern:*

Be it known that I, EDWARD MARSHALL, of New York, N. Y., have invented certain new and useful Improvements in Saw-Sets; and I do hereby declare that the following is a full, clear, and exact description of the same, reference being had to the accompanying drawings and to the letters of reference marked thereon.

The nature of my invention consists in the employment of two or more claws, one of which at least shall hold the saw, while another shall bend or set the teeth, as will be hereinafter fully described.

In the annexed drawings A, represents the body of the instrument, and to this body are secured two handles, B, and C, by means of pivots at 2, 2. The handle C, is provided near its upper extremity with a claw marked $e$, and the handle B, is provided in like manner with two claws, $a$, $a$, which are situated sufficiently far apart to enable the claw $e$, to pass between them as is shown in Figs. 2 and 3.

To the lower ends of these handles are secured two springs F, F, which extend up toward the body A, meeting, and operating against each other when the instrument is used, as is shown in Fig. 2, for the purpose of throwing the handles apart, thus throwing back the claws and freeing the saw.

The body A, is provided with a slot $i$, into which the saw is placed, when it is desired to set the teeth of the same.

D, represents a slide which passes over the handle C, said slide being regulated and stationed at any desired point by means of screw I.

In the operation of this set, the saw is first placed in the slot $i$, the teeth being in the slide D, is then adjusted on the handle in such position as to allow the two handles to approach as near to each other as may be desired in giving the saw more or less set. When the handles approach very near to each other the set is more than when the handles do not approach so near. The saw being placed in the slot $i$, the two handles are brought together until the claws bear upon the saw, the claws $a$, $a$, press the saw firmly against the upper part of slot $i$, marked $m$. When the saw is clamped thus the end of claw $e$, presses upon the tooth to be set and bends it in the nitch $n$, by opening the handles the saw is set free again, and is slipped along in the groove until the next tooth but one comes under claw $e$, and then the handles are again pressed together the claws $a$, $a$, catching and holding it while the claw $e$, bends the tooth as in the former instance, and thus by passing the saw along its teeth are set from one end of the saw to the other. The body of the instrument is so formed that while the claw $e$, is operating upon the tooth there is nothing back of the tooth against which it may press to flatten or in any manner damage or injure it, as I use no die or bevel plate, against which the tooth is pressed to set or bend the said tooth.

Having thus fully described my invention what I claim as new and desire to secure by Letters Patent is—

The within described method of setting saws, whereby the saw is firmly clamped, and held in the slot $i$, by means of claws $a$, $a$, while the tooth is being bent or set, the saw being alternately clamped and released, as the teeth are successively set, as is herein fully described.

EDWD. MARSHALL.

Witnesses:
C. M. ALEXANDER,
A. A. YEATMAN.